(12) United States Patent
Takeuchi

(10) Patent No.: US 7,573,226 B2
(45) Date of Patent: Aug. 11, 2009

(54) MOTOR AND MOTOR DRIVE SYSTEM

(75) Inventor: Kesatoshi Takeuchi, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 11/818,568

(22) Filed: Jun. 14, 2007

(65) Prior Publication Data

US 2007/0241706 A1 Oct. 18, 2007

Related U.S. Application Data

(62) Division of application No. 11/070,406, filed on Mar. 1, 2005, now Pat. No. 7,315,147.

(30) Foreign Application Priority Data

Mar. 2, 2004 (JP) ............................ 2004-058064

(51) Int. Cl.
*H02P 6/00* (2006.01)
(52) U.S. Cl. ................. 318/723; 318/700; 318/400.38
(58) Field of Classification Search ................ 318/700, 318/723, 400.37–400.4
See application file for complete search history.

(56) References Cited

U.S. PATENT DOCUMENTS

| | | | |
|---|---|---|---|
| 5,223,772 A * | 6/1993 | Carobolante | 318/400.13 |
| 5,644,224 A | 7/1997 | Howard | |
| 5,751,089 A | 5/1998 | Stridsberg | |
| 5,798,623 A | 8/1998 | El-Sadi | |
| 5,818,188 A | 10/1998 | Hirai et al. | |
| 5,942,876 A | 8/1999 | Maekawa | |
| 6,025,691 A | 2/2000 | Kawabata et al. | |
| 6,034,499 A * | 3/2000 | Tranovich | 318/650 |
| 6,362,586 B1 * | 3/2002 | Naidu | 318/432 |
| 6,744,230 B2 * | 6/2004 | Hill et al. | 318/400.04 |
| 6,965,227 B2 * | 11/2005 | Blossfeld | 324/166 |

FOREIGN PATENT DOCUMENTS

| | | |
|---|---|---|
| JP | 52-38315 | 9/1950 |
| JP | 55-79699 | 11/1953 |
| JP | 57-55294 | 9/1955 |
| JP | 51-095212 | 8/1976 |
| JP | 54-129417 | 10/1979 |
| JP | 60-180468 | 9/1985 |

(Continued)

*Primary Examiner*—Walter Benson
*Assistant Examiner*—Renata McCloud
(74) *Attorney, Agent, or Firm*—Harness, Dickey & Pierce, P.L.C.

(57) ABSTRACT

Provided is a motor having a combination of a plurality of coil pairs and a permanent magnet, wherein these coil pairs are supplied with an excitation signal from a drive circuit so as to be excited at alternate opposite poles, and the permanent magnet is constituted such that the plurality of polar elements is disposed to become alternating opposite poles; the drive circuit is constituted to supply an excitation signal having a prescribed frequency to the coil pairs, and relatively move the coil pairs and permanent magnet with the magnetic attraction—repulsion between the coils and permanent magnet; and the drive circuit is constituted to supply to the coil pairs a waveform signal corresponding to the pattern of the back electromotive voltage to be generated in accordance with the relative movement between the coil pairs and permanent magnet.

6 Claims, 16 Drawing Sheets

FOREIGN PATENT DOCUMENTS

| | | |
|---|---|---|
| JP | 62-141998 | 6/1987 |
| JP | 7-503598 | 4/1995 |
| JP | 08-051745 | 2/1996 |
| JP | 09-047071 | 2/1997 |
| JP | 10-290558 | 10/1998 |
| JP | 2000-350485 | 12/2000 |
| JP | 2001-298982 | 10/2001 |
| WO | 93-15547 | 8/1993 |

* cited by examiner

FIG.3
(1)
A PHASE ELECTROMAGNETIC COIL CIRCUIT
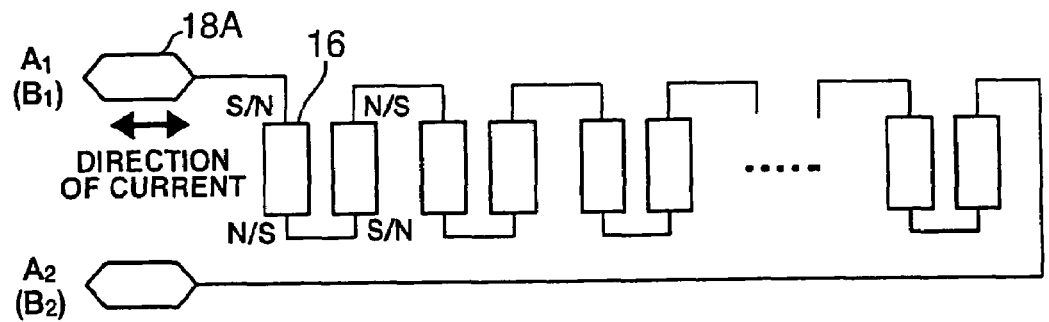
(2)
B PHASE ELECTROMAGNETIC COIL CIRCUIT
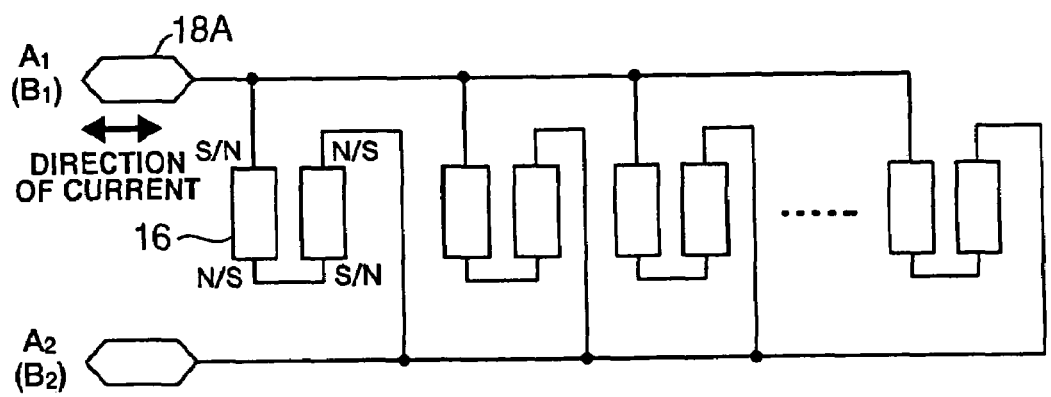

FIG.5
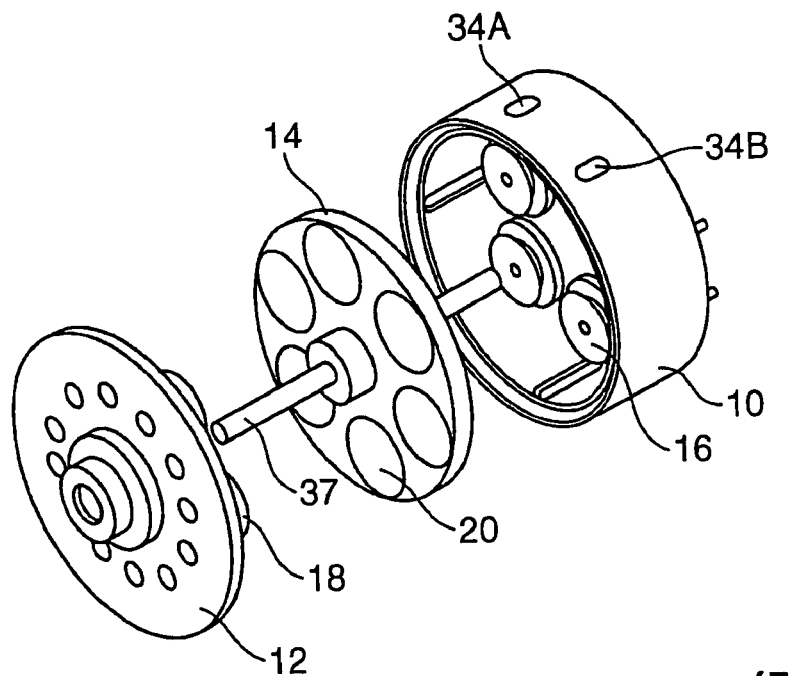
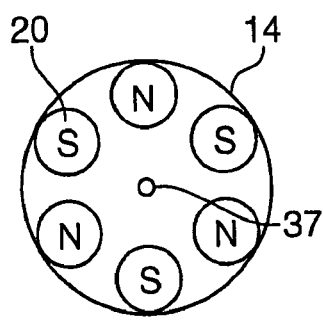
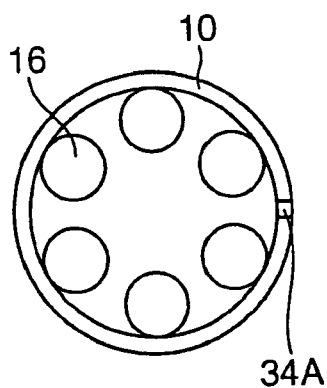
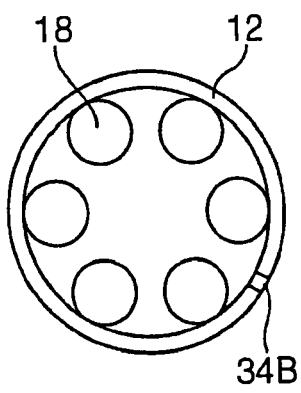
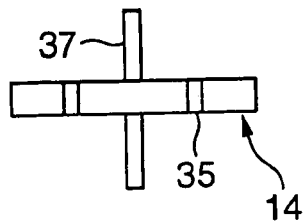

FIG.6
(1) $f1A := x \to 1.3 \left[ \sum_{a=1}^{50} \frac{\sin((2a-1)x)}{2a-1} \right]$
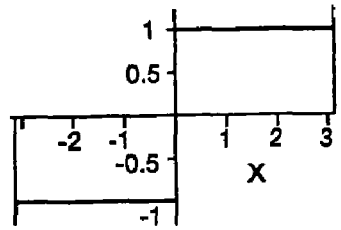
(2) $f2 := x \to \sin\left[ x - \frac{\text{delay}\pi}{180} \right]$
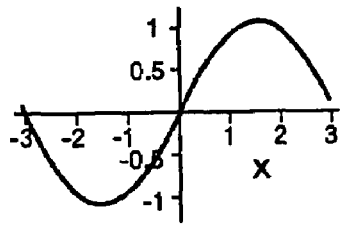
(3) $f1A(x) - f2(x)$
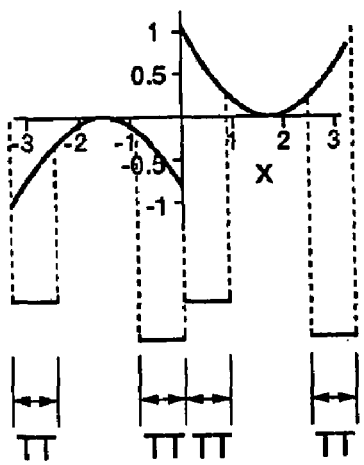

FIG.8
(1) f1 B:=sin
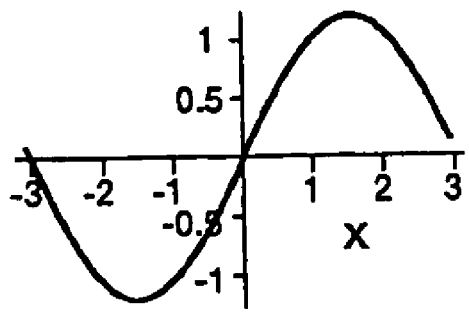
(2) f1 B(x) − f2(x)
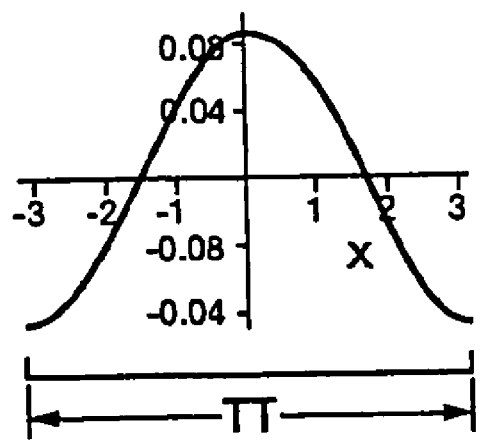

MOTOR AND MOTOR DRIVE SYSTEM

CROSS REFERENCE TO RELATED APPLICATIONS

This application is a divisional patent application of U.S. Ser. No. 11/070,406 filed Mar. 1, 2005, claiming priority to Japanese Patent Application No. 2004-058064 filed Mar. 2, 2004, all of which are incorporated by reference.

BACKGROUND OF THE INVENTION

1. Field of the Invention

The present invention relates to various motors constituted to rotate a rotor or move a slider formed from a permanent magnet or ferromagnetic material by linearly arranging coils that generate magnetic poles and sequentially switching the current to be applied to the coil, a magnetic structure to be employed in such a motor, and a power driver employing this motor as its drive source. The present invention may be employed in the likes of an electric vehicle, electric cart and electric wheelchair, as well as an electric toy, electric airplane, small electronic appliances and MEMS as the foregoing power driver.

2. Description of the Related Art

An AC motor driven with a frequency signal such as an alternating current can be broadly classified into two types; namely, a synchronous motor and an induction motor. A synchronous motor is a motor that uses a layered core of a permanent magnet or a ferromagnetic material such as iron in the rotor, and rotates at a rotation speed that is the same as the speed of the rotating magnetic field determined based on the power supply frequency.

Depending on the type of rotor, there are various types of motors such as a magnetic type which uses a permanent magnet, a coil type with a coil wound thereto, and a reactance type which uses a ferromagnetic material such as iron. Among the above, with the magnetic type motor rotates by the permanent magnet of the rotor being pulled with the rotating magnetic field of the stator. Meanwhile, the induction motor is a motor that rotates by generating a separate magnetic field with the electromagnetic induction effect to a rotor having a box-shaped conduction wire.

Among the foregoing motors, there is a motor that does not rotate, but rather moves linearly or moves freely on a flat surface. This kind of motor is generally referred to as a linear motor, and moves the permanent magnet or ferromagnetic material mounted thereon by linearly arranging coils that generate magnetic poles and sequentially switching the current to be applied to the coil. The linearly disposed coil array is the stator, and the rotor corresponds to a flat slider that slides thereabove.

As a magnetic synchronous motor, for instance, there is a small synchronous motor described in the gazette of Japanese Patent Laid-Open Publication No. H8-51745 (Patent Document 1). This small synchronous motor, as shown in FIG. 1 of Patent Document 1, is constituted by comprising a stator core 6 wound with an excitation coil 7, and a rotor 3 having a rotor core 2 having a magnet 1 build therein and in which the NS poles are aligned in even intervals around the peripheral face thereof.

SUMMARY OF THE INVENTION

Nevertheless, when a rectangular wave is supplied to the coil of the motor explained in the foregoing conventional technology, the present inventors newly discovered that the operation efficiency of the motor deteriorates significantly. Thus, an object of the present invention is to provide a motor superior in operation efficiency by controlling the excitation signal to be supplied to the coil of the motor. Another object of the present invention is to provide a motor superior in the generated torque characteristics. Still another object of the present invention is to provide a drive circuit of such a motor. Yet another object of the present invention is to provide a drive control method of the motor superior in operation efficiency. Still another object of the present invention is to provide various power drivers employing such a motor.

In order to achieve the foregoing objects, the present invention provides a motor having a combination of a plurality of coil pairs and a permanent magnet, wherein these coil pairs are supplied with an excitation signal from a drive circuit so as to be excited at alternate opposite poles, and the permanent magnet is constituted such that the plurality of polar elements is disposed to become alternating opposite poles; the drive circuit is constituted to supply an excitation signal having a prescribed frequency to the coil pairs, and relatively move the coil pairs and permanent magnet with the magnetic attraction—repulsion between the coils and permanent magnet; and the drive circuit is constituted to supply to the coil pairs a waveform signal corresponding to the pattern of the back electromotive voltage to be generated in accordance with the relative movement between the coil pairs and permanent magnet.

In an embodiment of the present invention, the drive circuit comprises a hall element sensor for detecting the magnetic variation of the permanent magnet, this hall element sensor is used for outputting a waveform; for example, a sinusoidal waveform or a triangular waveform, corresponding to the magnetic change, and the drive circuit is constituted to directly supply the output of this hall sensor to the coil pairs. The motor further comprising a plurality of phases as the coil pairs, and a hall element sensor is disposed for each phase. The disposition of coils between the coil pairs of the plurality of phases is mutually shifted, and the disposition of the hall element sensor between the plurality of phases is also shifted. The shift amount of the coil position of the coil pairs of the plurality of phases is determined so as to enable the rotation of the permanent magnet when the output from the hall element is supplied to the coil pairs of the plurality of phases upon supplying power to the drive circuit. A rotor formed from the permanent magnet is disposed between the plurality of coil phases arranged circularly. The drive circuit supplies a rectangular wave to each of the phase coils when the motor is started, and the drive circuit supplies the back electromotive voltage waveform to each of the phase coils while the motor is in a state of operational stability.

Further, the present invention also provides a drive system of an AC motor, wherein the AC motor excites the electromagnetic coil with a waveform that is identical to the back electromotive force waveform inherent in the AC motor. Preferably, the waveform is formed with a hall element sensor. More preferably, the waveform formed with the hall element sensor is formed via PWM control means.

BRIEF DESCRIPTION OF THE DRAWINGS

FIG. 3(1) is an equivalent circuit diagram of coil pairs in which a plurality of coils is connected serially; and FIG. 3(2) is an equivalent circuit diagram in a case of such coils being connected in parallel;

FIG. 5 is an exploded perspective view of the motor;

FIG. 6 is a characteristic diagram showing a case of supplying a rectangular wave to the coil for explaining the principal of the present invention;

FIG. 8 is a characteristic diagram showing a case where a waveform that is roughly equivalent to a sinusoidal waveform of the back electromotive force is supplied to the coil as the drive waveform for explaining the principal of the present invention;

DETAILED DESCRIPTION OF THE PREFERRED EMBODIMENTS

Figure 1:
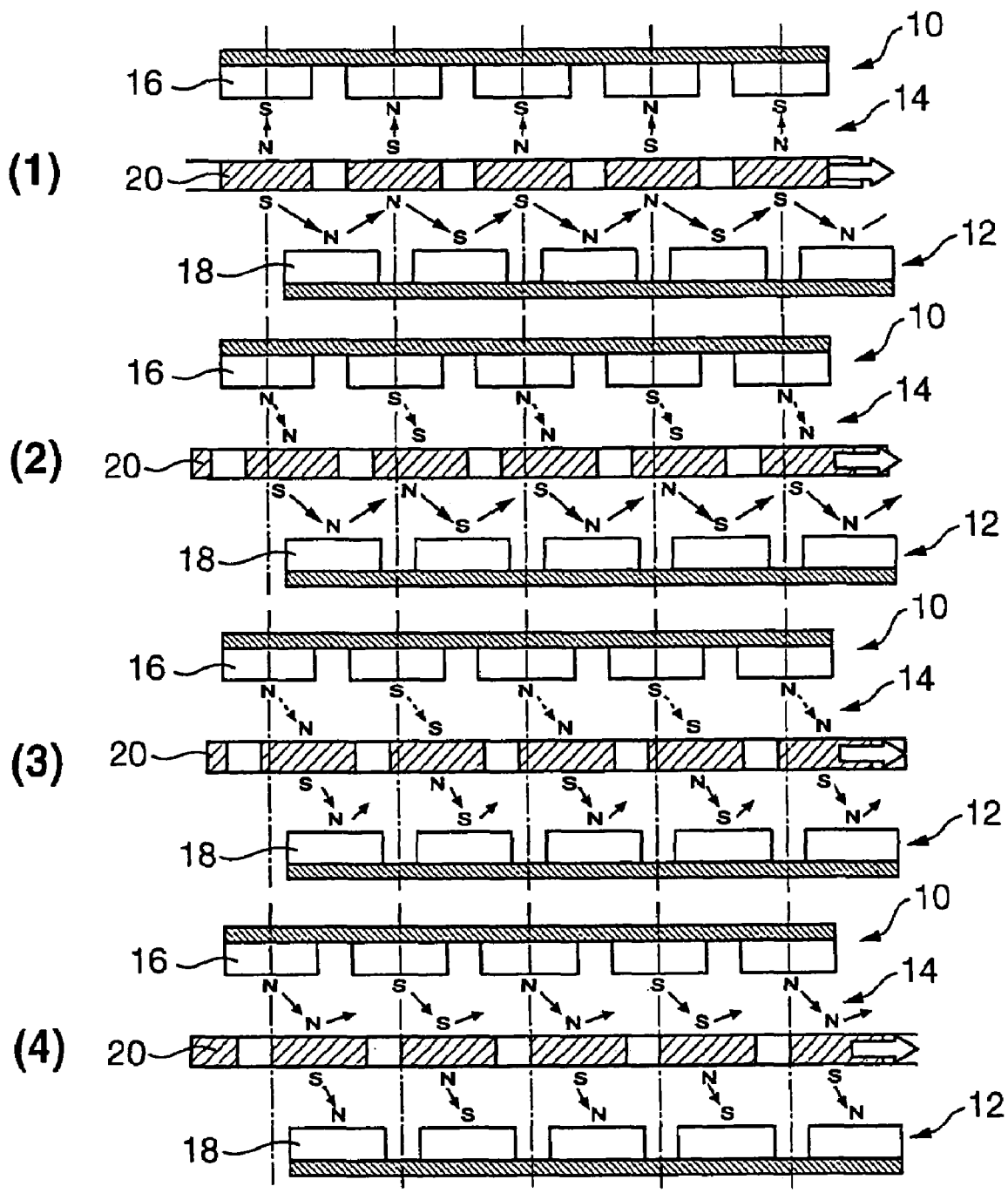
FIG. 1 is a diagram showing the frame format and principal of operation of the magnetic structure pertaining to the present invention.
Figure 2:
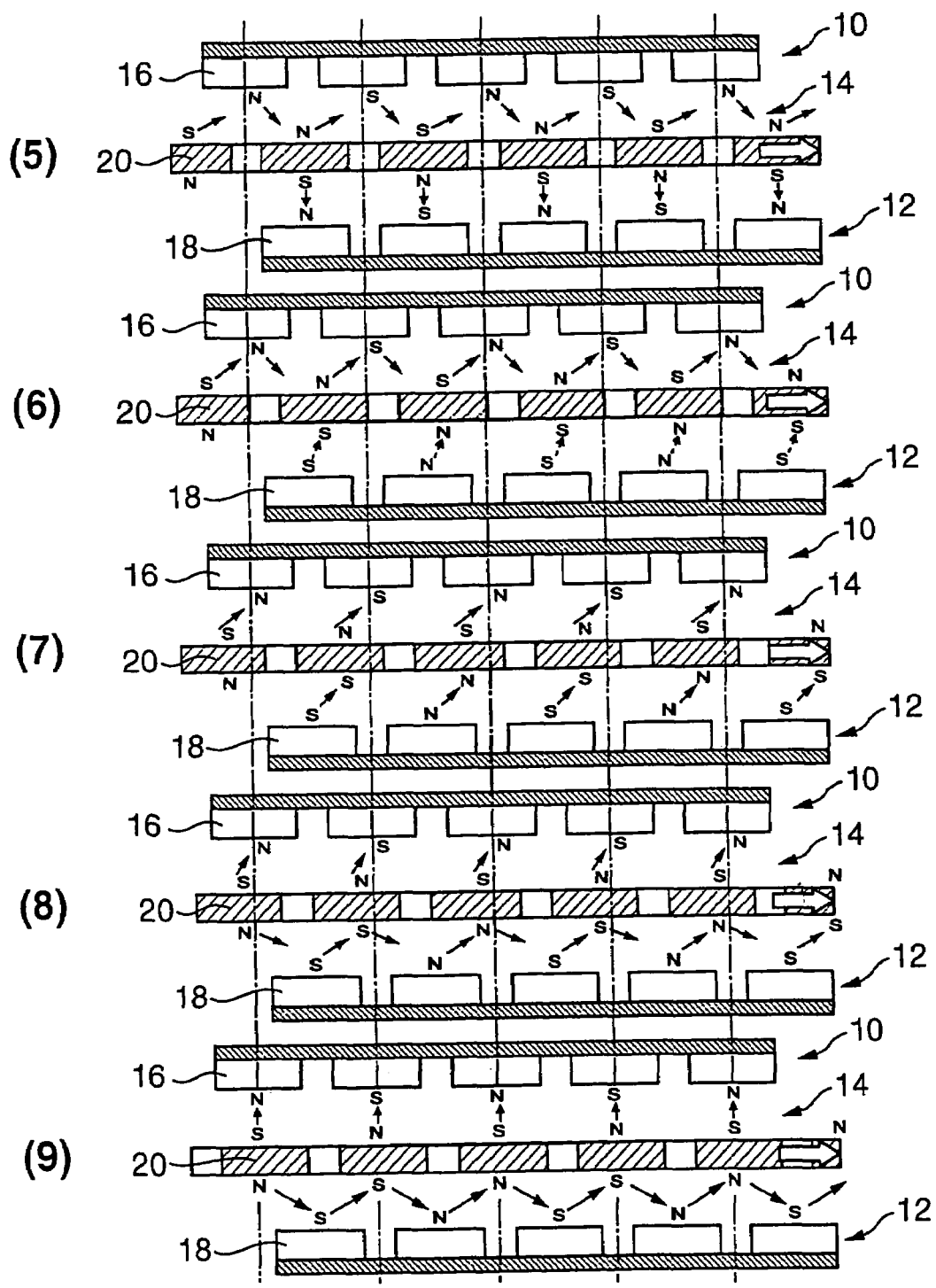
FIG. 2 is a diagram showing the principal of operation subsequent to FIG. 1.

FIG. 1 and FIG. 2 are diagrams showing the principal of operation of the motor pertaining to the present invention. This motor has a constitution where a third permanent magnet 14 is interposed between a first coil pair (A phase coil) 10 and a second coil pair (B phase coil) 12. The coils and permanent magnet may be constituted circularly (arc, circle) or linearly. When formed circularly, either the permanent magnet or the coil phase functions as the rotor, and, when formed linearly, one of the above becomes a slider.

A first coil pair 10 comprises a constitution in which the coils 16 alternately excitable to the opposite poles are sequentially aligned in a prescribed spacing, preferably an even spacing. FIG. 5 is an equivalent circuit diagram of this first coil pair. According to FIG. 1 and FIG. 2, as described later, with a two-phase excitation coil, all coils are excited to be constantly driven against the two-phase exciting coil during the start-up rotation ($2\pi$) with the foregoing polarity. Therefore, a drive means such as a rotor or slider can be rotated and driven at high torque.

As shown in FIG. 3(1), a plurality of electromagnetic coils 16 (magnetic unit) to be alternately excited at opposite poles is connected serially in even spacing. Reference numeral 18A is a block showing the drive circuit for applying a frequency pulse signal to these magnetic coils. When an excitation signal for exciting the coils is sent from the excitation circuit to the electromagnetic coils 16, the respective coils are pre-set to be excited such that the direction of the magnetic poles will alternate between the adjacent coils. As shown in FIG. 3(2), the electromagnetic coils 16 may also be connected in parallel. The structure of these coils are the same for both A and B phase coils.

When a signal having a frequency for alternately switching, in prescribed cycles, the direction of the polarity of the supplied excitation current is applied from the excitation circuit 18A to the electromagnetic coils 16, as shown in FIG. 1 and FIG. 2, a magnetic pattern which alternately changes the polarity on the side facing the rotor 14 from N pole→S pole→N pole is formed in the A phase coil pair 10. When the frequency signal becomes a reverse polarity, a magnetic pattern is generated for alternately changing the polarity, which is on the third magnetic body side, of the first magnetic body from S pole→N pole→S pole. As a result, the excitation pattern appearing in the A phase coil pair 10 will periodically change.

Although the structure of the B phase coil pair is the same as the A phase coil pair, the electromagnetic coils 18 of the B phase coil pair differs with respect to the point that it is aligned by being positionally shifted in relation to the [electromagnetic coils] 16 of the A phase coil pair. In other words, the array pitch of the coil in the A phase coil pair and the array pitch of the B phase coil pair are disposed in an offset so as to have a prescribed pitch difference (angular difference). This pitch difference is preferably the (single rotation) of the angle in which the permanent magnet 14 moves corresponding to 1 cycle ($2\pi$) of the excitation current frequency in relation to the coils 16, 18; for instance $\pi/6$ ($\pi/(2/M)$: M is the number of sets of permanent magnet (N+S) where M=3).

The permanent magnet is now explained. As depicted in FIG. 1 and FIG. 2, the rotor 14 formed from a permanent magnet is disposed between a two-phase coil pair, and a plurality of permanent magnets 20 (marked out in black) having alternately reverse polarities is aligned in a line (linearly or in an arc) in prescribed spacing, preferably in even spacing. An arc shape includes loops such as a perfect circle or an oval shape, as well as indefinite circular structures, half circles, fan shapes, and so on.

The A phase coil pair 10 and B phase coil pair 12 are disposed via equal spacing, and a third magnetic body 14 is disposed between the A phase coil pair and B phase coil pair. The array pitch of the permanent magnet 20 is roughly the same as the array pitch of the magnetic coil in the A phase coil 10 and B phase coil 12.

Next, the operation of the magnetic structure in which the foregoing third magnetic body is disposed between the first magnetic body 10 and second magnetic body 12 is explained with reference to FIG. 1 and FIG. 2. Let it be assumed that, based on the foregoing excitation circuit (reference numeral 18 illustrated in FIG. 3; to be described in detail later), the excitation pattern shown in FIG. 1(1) is being generated at a certain moment in the electromagnetic coils 16, 18 of the A phase coil and B phase coil. Here, a magnetic pole in the pattern of→S→N→S→N→S→is generated in the respective coils 16 on the surface facing the side of the permanent magnet 14 of the A phase coil 10, and a magnetic pole in the pattern of→N→S→N→S→N→is generated in the coil 18 on the surface facing the side of the permanent magnet 14 of the B phase coil 12. In the diagrams, the magnetic relation between the permanent magnet and the respective phase coils is illustrated, and a repulsive force will arise between the same poles and an attractive force will arise between opposite poles.

The next instant, as shown in FIG. 1(2), when the polarity of the pulse wave applied to the A phase coil via the drive circuit 18 is reversed, a repulsive force will arise between the magnetic pole generated to the coils 16 of the A phase coil 10 and the magnetic pole of the permanent magnet 20. Meanwhile, since an attracting force is generated between the magnetic pole generated to the coils 18 of the B phase coil 12 and the magnetic pole on the surface of the permanent magnet, as shown in FIG. 1(1) to FIG. 2(5), the permanent magnet 14 will sequentially move rightward in the diagram.

A pulse wave having a phase lag in comparison to the exciting current of the A phase coil applied to the coils 18 of the B phase coil 12, and, as shown in FIG. 2(6) to (8), the magnetic pole of the coils 18 of the B phase coil 12 and the magnetic pole on the surface of the permanent magnets 20 repel against each other, and move the permanent magnet 14 further rightward. FIG. 1(1) to FIG. 2(8) illustrate a case where the rotor 14 engages in a rotation corresponding to $\pi$, and FIG. 3(9) onward illustrate a case where such rotor 14 engages in a rotation corresponding to $\pi \rightarrow 2\pi$. As described above, the rotor will rotate by supplying a drive current (voltage) signal of a prescribed frequency with a shifted phase to the A phase coil array and B phase coil array.

When the A phase coil array, B phase coil array and the permanent magnet are formed in an arc, the magnetic structure depicted in FIG. 1 will become a structure of a rotating motor, and, when these are formed linearly, the magnetic structure thereof will become a linear motor. Excluding the portions of the permanent magnet such as a case or rotor and the electromagnetic coil can be reduced in weight by employing a non-magnetic body such as resin (including carbon) or ceramics, and a rotating power drive superior in a power-weight ratio can be realized without generating iron loss as a result of opening the magnetic circuit without using a yoke.

According to this magnetic structure, since the permanent magnet is able to move upon being subject to the magnetic force from the A phase coil and the B phase coil, the torque upon moving the permanent magnet will increase, and, since the torque/weight balance will become superior, a small motor capable of driving at a high torque can be provided thereby.

Figure 4:
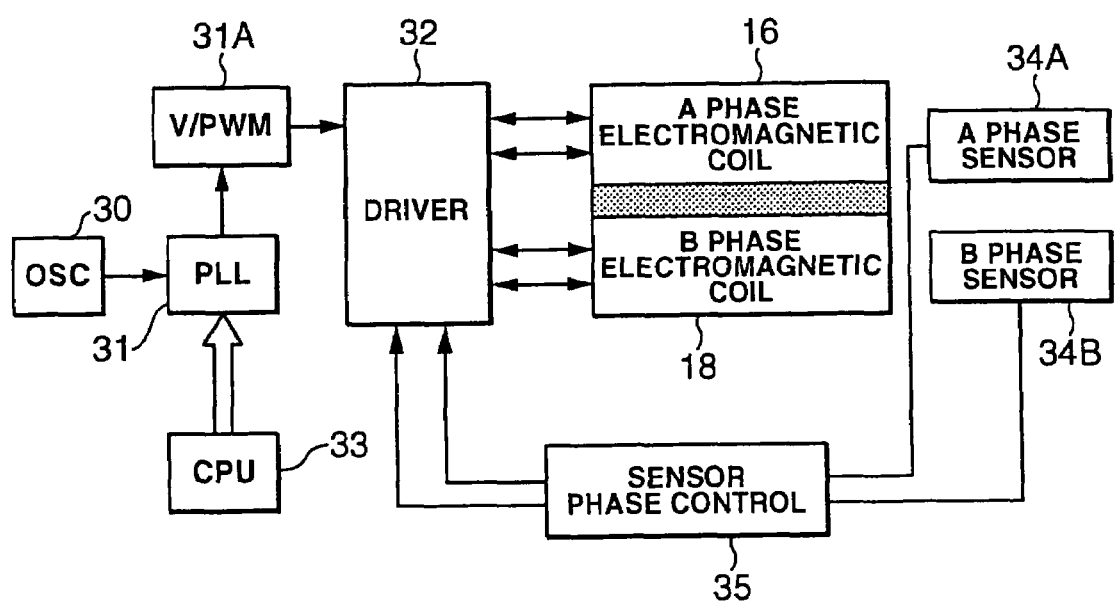
FIG. 4 is a block diagram of the drive circuit for supplying an excitation signal to a coil pair.

FIG. 4 is a block diagram showing an example of an excitation circuit 18A for applying an exciting current to the electromagnetic coils 16 of the first magnetic body of the A phase coil array and the electromagnetic coils 18 of the B phase coil array. This excitation circuit is structured to respectively supply controlled pulse frequency signals to the A-phase electromagnetic coils 16 and the B-phase electromagnetic coils 18. Reference numeral 30 is a quartz oscillator, and reference numeral 31 is an M-PLL circuit for generating a reference pulse signal by M-dividing this oscillation frequency signal.

Reference numeral 34 is a sensor (i.e., a hall element sensor for detecting the magnetic field change of the permanent magnet as described later) for generating a position detection signal corresponding to the rotational speed of the rotor 14 formed from the permanent magnet. Reference numeral 34A is an A phase side sensor for supplying a detection signal to the driver circuit of the A phase electromagnetic coil, and reference numeral 34B is a B phase side sensor for supplying a detection signal to the driver circuit of the B-phase electromagnetic coil.

The detection signals from these sensors 34A, 34B are respectively output to the driver 32 for supplying an exciting current to the respective phase coil arrays. Reference numeral 33 is a CPU and outputs a prescribed control signal to the M-PLL circuit 31 and the driver 32. The driver 32 is constituted to supply the detection signal from the sensor directly, or via PWM control, to the electromagnetic coil. Reference numeral 31A is a control unit for supplying a PWM control reference wave to the driver. Although the magnetic sensor 34A for the A phase coil array and the magnetic sensor 34B for the B phase coil array are respectively detecting the magnetic field of the permanent magnet by establishing a phase difference, the detection signal is phase-controlled as necessary and supplied to the driver 32. Reference numeral 35 is a sensor phase control unit.

FIG. 5 is a perspective view of the motor, wherein FIG. 5(1) is a perspective view of the motor; FIG. 5(2) is a schematic plan view of the rotor; FIG. 5(3) is a side view thereof; FIG. 5(4) is a diagram showing an A phase electromagnetic coil array; and FIG. 5(5) is a diagram showing a B phase electromagnetic coil array. The reference numerals used in FIG. 5 are the same as the structural components corresponding to the foregoing diagrams.

The motor comprises a pair of A phase coil array 10 and B phase coil array 12 corresponding to a stator, as well as the permanent magnet 14 constituting the rotor described above, and the rotor 14 is rotatably disposed around the axis 37 and between the A phase coil array and B phase magnetic body. The rotating axis 37 is fitted into an opening in the center of the rotor such that the rotor and rotating axis can rotate integrally. As shown in FIG. 5(2), (4) and (5), six permanent magnets are provided to the rotor in even spacing around the circumferential direction thereof, polarities of the permanent magnets are made to be mutually opposite, and six electromagnetic coils are provided to the stator in even spacing around the circumferential direction thereof.

The A phase sensor 34A and B phase sensor 34B are provided to the inner side wall of the case of the A phase coil array via a phase shift (distance corresponding to $\pi/6$). The A phase sensor 34A and B phase sensor 34B are subject to mutual phase shifts for providing a prescribed phase different to the frequency signal to be supplied to the A phase coil 16 and the frequency signal to be supplied to the B phase coil 18.

As the sensor, it is preferable to use a hall element employing the hall effect and which is capable of detecting the position of the permanent magnet from the change in the magnetic pole pursuant to the movement of the permanent magnet. As a result of employing this sensor, when the S pole of the permanent magnet to the subsequent S pole is set to $2\pi$, the hall element will be able to detect the position of the permanent magnet regardless of where the permanent magnet is located.

The principal of the present invention is now explained.

Figure 7:
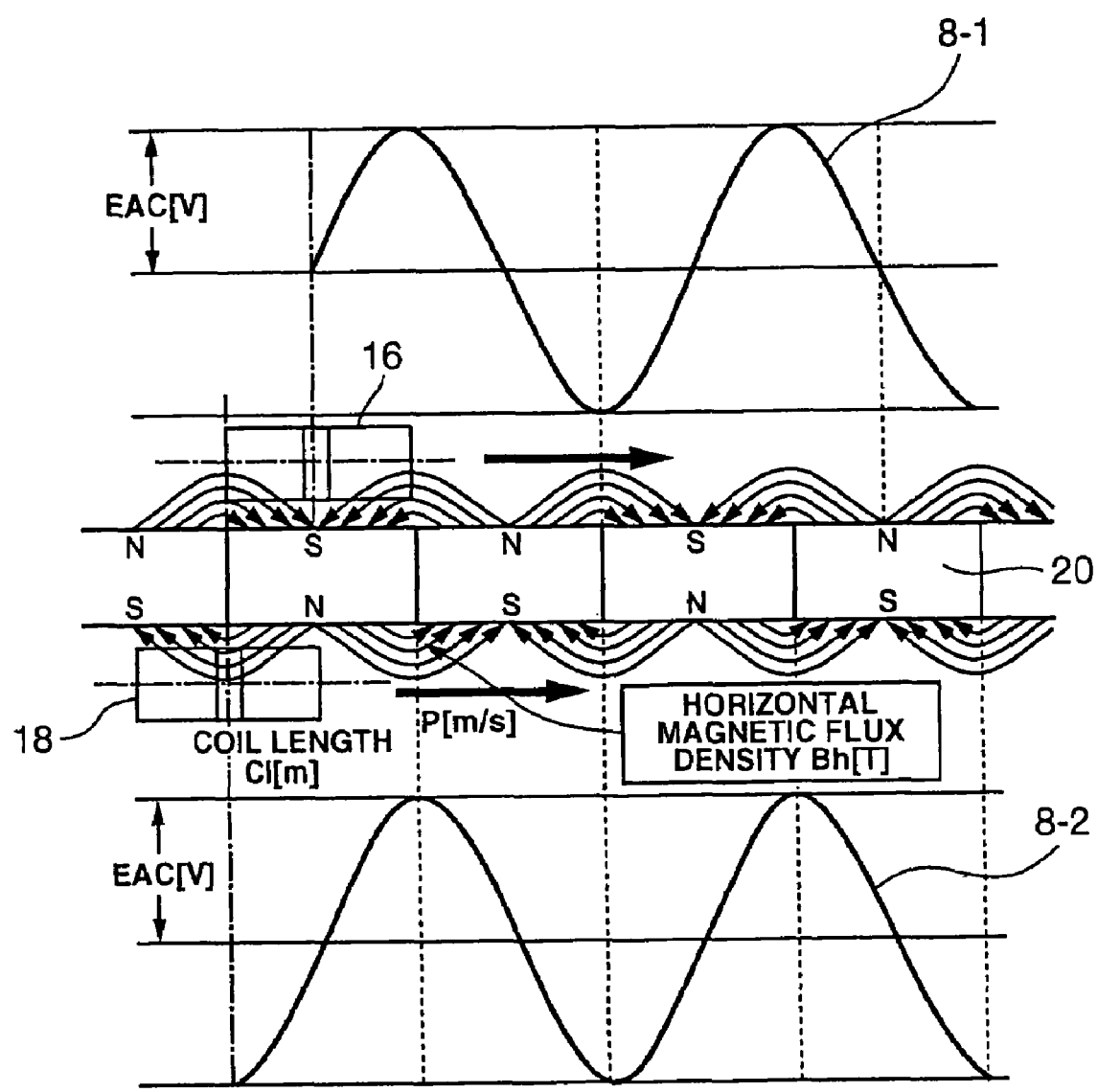
FIG. 7 is a principal diagram showing a situation where back electromotive force is generated in the coil.

FIG. 6(1) is a diagram showing the potential change at both ends of the coil when a rectangular wave is supplied to the coil. FIG. 6(2) is a diagram showing the back electromotive voltage waveform of both ends of the coil. FIG. 6(3) is a diagram showing the current consumption waveform of both ends of the coil. FIG. 7 is a principal diagram for explaining the back electromotive force that is generated in the coil when the permanent magnet disposed between two-phase coil arrays moves rightward in the diagram.

The back electromotive voltage (V) is defined with Bh*Cl*P, Bh[T] is the horizontal magnetic flux density (center of coil), CL(m) is the coil length, and P[m/s] represents the movement speed of the coil. A sinusoidal back electromotive voltage waveform represented with 8-1 is generated in the A phase coil 16, and a sinusoidal back electromotive voltage waveform represented with 8-2 having a phase difference based on the alignment of the A phase coil array and the alignment of the B phase coil array is generated in the B phase coil 18.

The double-ended voltage in the π area of FIG. 6(3) will have an increased current since the potential difference is significant due to the difference between the applied voltage and the back electromotive force. Thus, although the generated torque of the motor will increase, the efficiency of the motor will deteriorate. Efficiency (η) is defined by:

η=(mechanical output/input voltage)*100(%).

Meanwhile, FIG. 8(1) is a diagram showing the voltage waveform of both ends of the coil when a sinusoidal signal (supplied voltage waveform) that is identical to the back electromotive force waveform is applied to both ends of the coil. FIG. 8(2) is a diagram showing the voltage consumption waveform of the coil. Only the waveform distortion is generated in the voltage at both ends of the coil shown in area π of FIG. 8(2) based on the difference between the supplied voltage waveform and the back electromotive voltage waveform, and the current consumption waveform of both ends of the coil will become an extremely small current value as evident from the vertical axis scale of FIG. 6(2) and the vertical axis scale of FIG. 8(2). Thus, the efficiency can be considerably improved. By improving the waveform distortion, the efficiency can be further improved. The analog output-type hall element is able to output a waveform corresponding to the back electromotive voltage waveform. As a result of exciting the coil with a waveform that is the same as the back electromotive force waveform, the efficiency will improve two-fold or three-fold in comparison to exciting the coil with a rectangular wave. Therefore, when this motor is employed in the load, the simultaneous pursuit of the drive characteristics and efficiency motor can be sought by supplying a rectangular waveform to the coil in a situation of emphasizing the start-up torque upon starting or accelerating the operation of the load, and supplying a sinusoidal wave to the coil during a stable drive.

Figure 9:
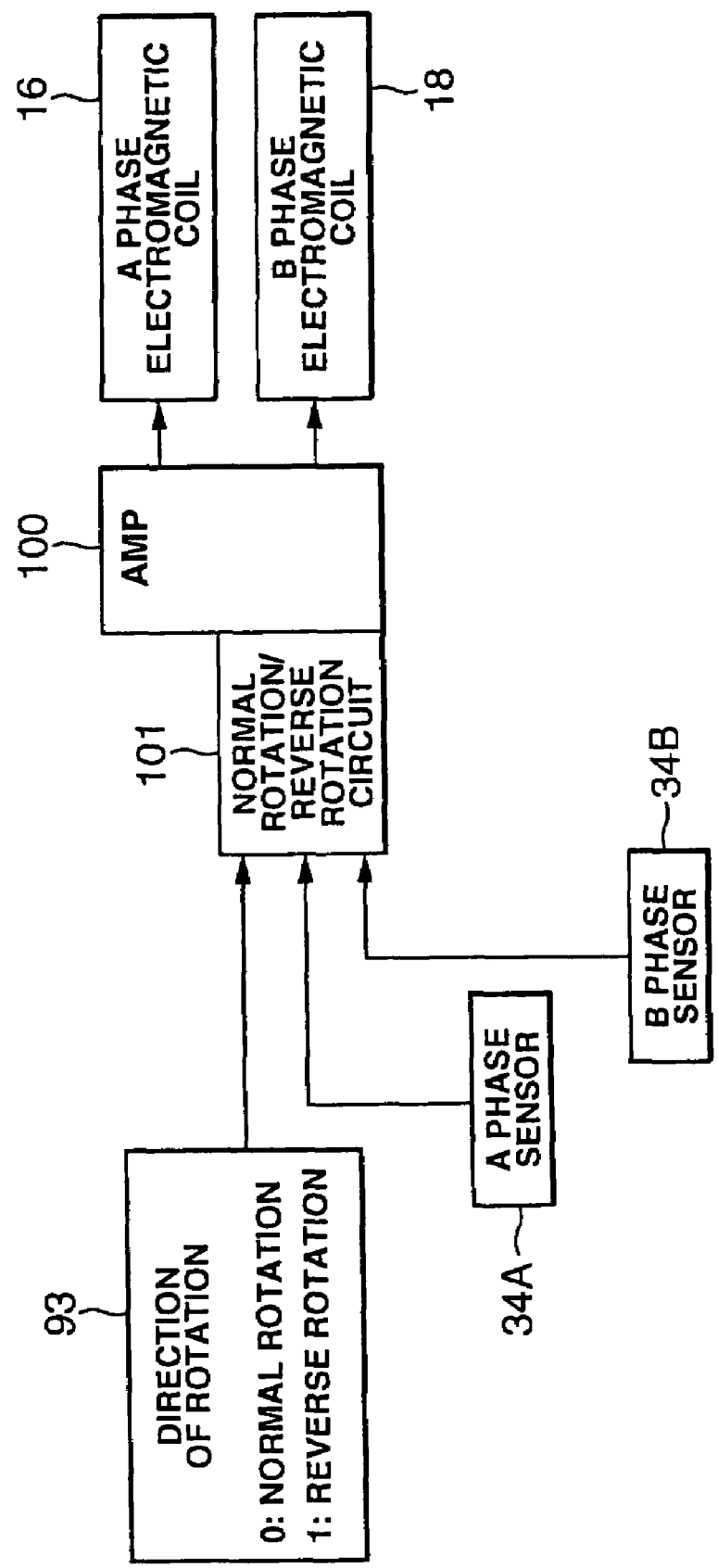
FIG. 9 is a block diagram of the drive circuit for supplying a sinusoidal waveform from the hall element sensor to the coil.
Figure 10:
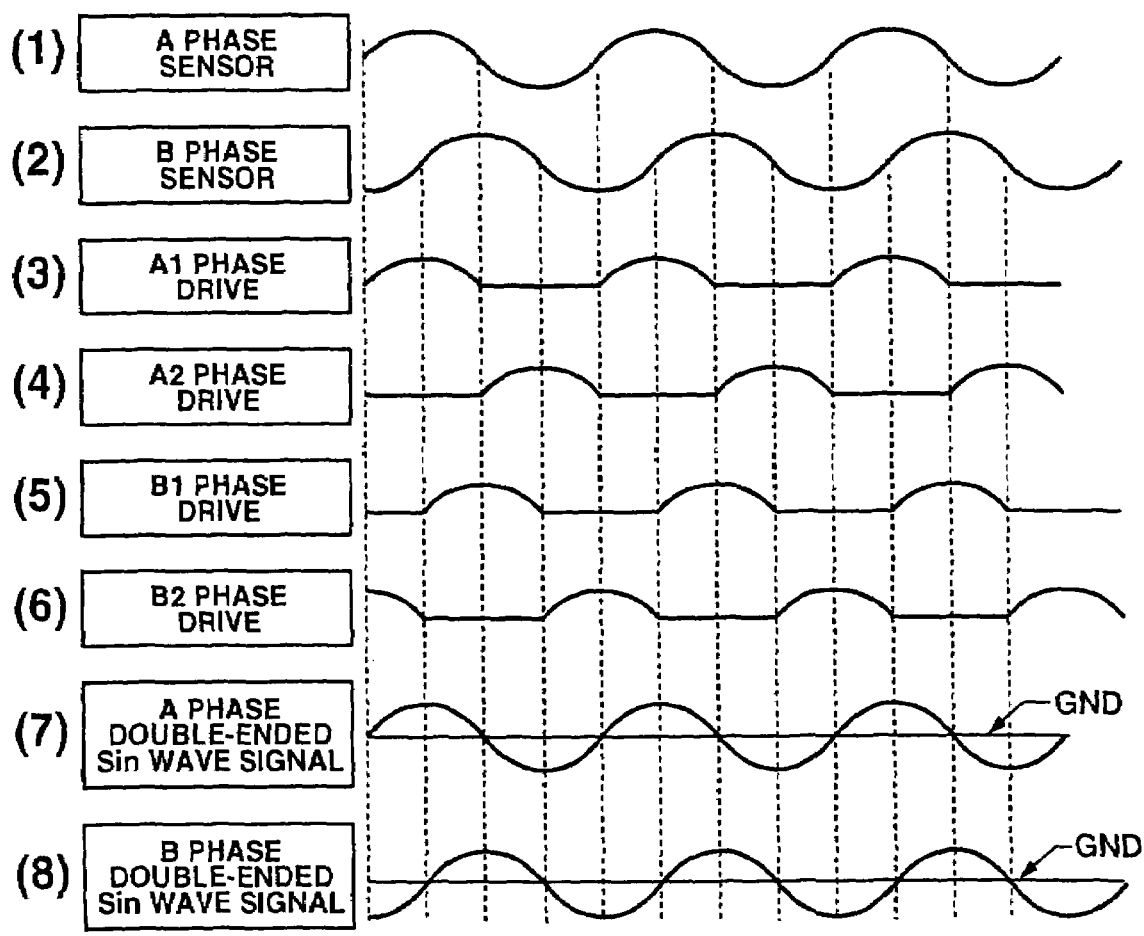
FIG. 10 is a waveform diagram respectively showing the state of waveform control in the drive circuit illustrated in FIG. 9.

FIG. 9 is a block diagram of the drive circuit for directly driving the driver with an analog sensor (hall element sensor). In other words, this sensor, as shown in FIG. 10(1) described later, generates a sinusoidal output wave that is closest to the back electromotive force waveform, as a result of supplying the output from this sensor directly to the coil, the motor can be driven at the maximum efficiency. Reference numeral 100 is an amplifier of the sensor output. Reference numeral 101 is the normal/reverse rotation control circuit of the rotor. The rotation of the rotor can be controlled by coercively reversing the polarity of the detection waveform from the sensor to be supplied to the coil of the A phase or B phase. Reference numeral 93 is the formation unit of a command signal to be supplied to this control circuit. The detection signal from the A phase sensor 34A is amplified and supplied to the A phase coil. The detection signal from the B phase sensor 34B is amplified and supplied to the B phase coil.

FIG. 10 is a diagram showing a state of controlling the waveform in the drive circuit, and FIG. 10(1) shows the analog output waveform (sinusoidal waveform) from the A phase sensor. FIG. 10(2) is the output waveform from the B phase sensor. As described above, since the two sensors are disposed with a phase difference, the phase is shifted. FIG. 10(3) is the A1 phase drive waveform (voltage waveform in the orientation of terminal A1→A2 illustrated in FIG. 3) to be supplied to the A phase coil, and FIG. 10(4) is the A2 phase drive waveform (voltage waveform in the orientation of terminal A2→A1 illustrated in FIG. 3) to be supplied to the A phase coil. FIG. 10(5) is the B1 phase drive waveform to be supplied to the B phase coil, and FIG. 10(6) is the B2 phase drive waveform. FIG. 10(7) is the waveform of both ends (between A1 and A2) between the A phase coil pair, and FIG. 10(8) is the waveform of both ends (between B1 and B2) between the B phase coil pair. The sinusoidal output waveform of the sensor is supplied to the coil pair of the respective phases.

Figure 11:
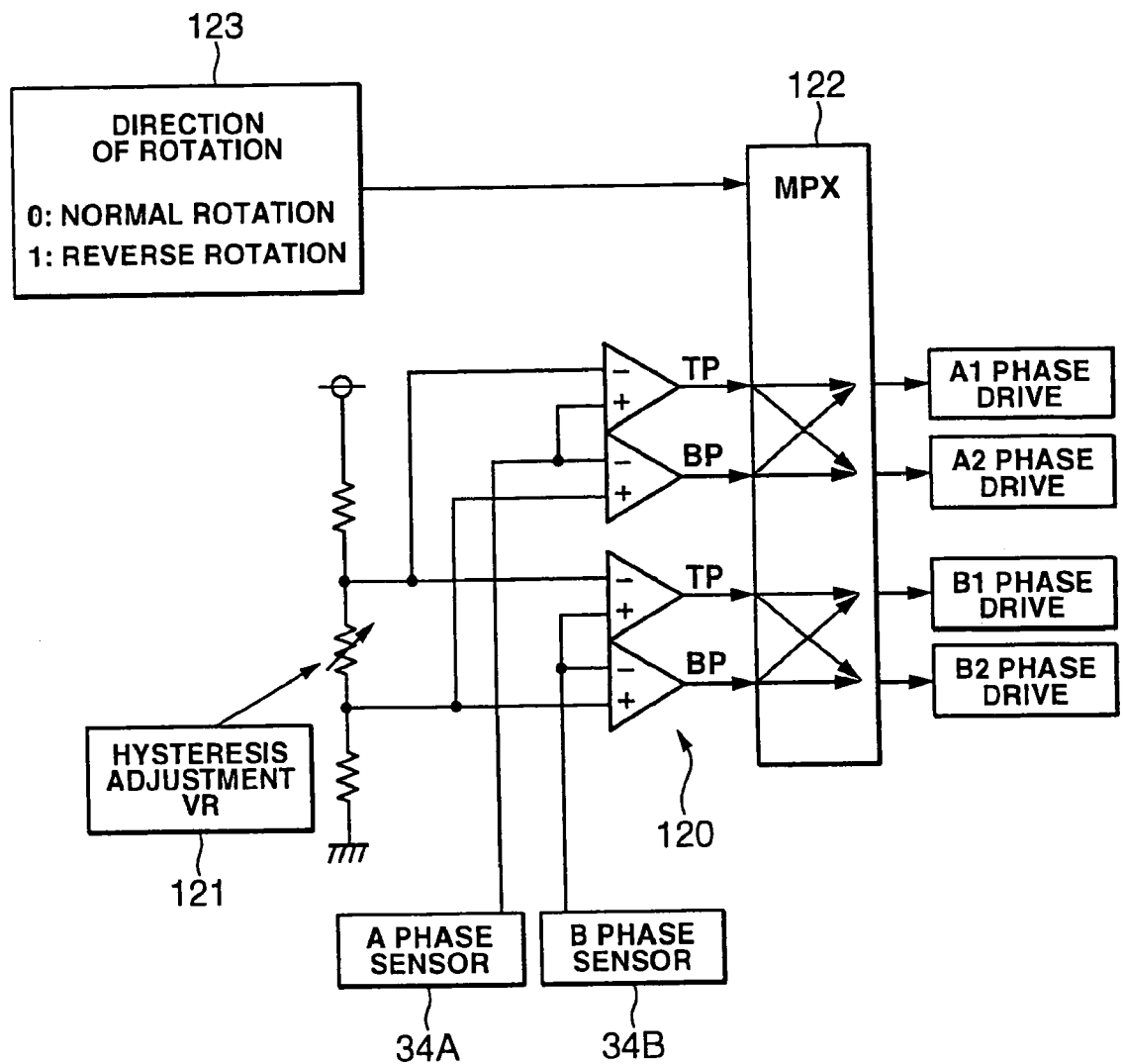
FIG. 11 is a drive circuit block diagram which enables the hysteresis control in the drive circuit.

FIG. 11 is a block diagram of the drive circuit for converting the analog output from the sensor into a rectangular wave and supplying this to the coil pair. As described above, when it is necessary to operate the motor at a high torque, there is significance in supplying the rectangular wave to the coil. The rotation speed of the motor is detected with the rotation speed sensor not shown, and, when the rotation speed of the motor exceeds a prescribed value (during a stable drive), the drive circuit directly supplies, in place of the rectangular wave, the analog output of the sensor to the coil array.

In FIG. 11, reference numeral 121 is the variable volume for controlling the hysteresis control, and reference numeral 120 is a window comparator, and reference numeral 122 is a multiplexer. The output value of the respective phase sensors is supplied to the window comparator, an H level signal and L level signal are formed upon comparing the upper and lower values of the sensor output and hysteresis level, and this is output as the A1 phase drive signal or A2 phase drive signal pursuant to the switching control of the multiplexer. The drive of the B1 phase coil and B2 phase coil is the same. Reference numeral 123 is the rotational direction control unit of the normal rotation or reverse rotation of the rotor.

Figure 12:
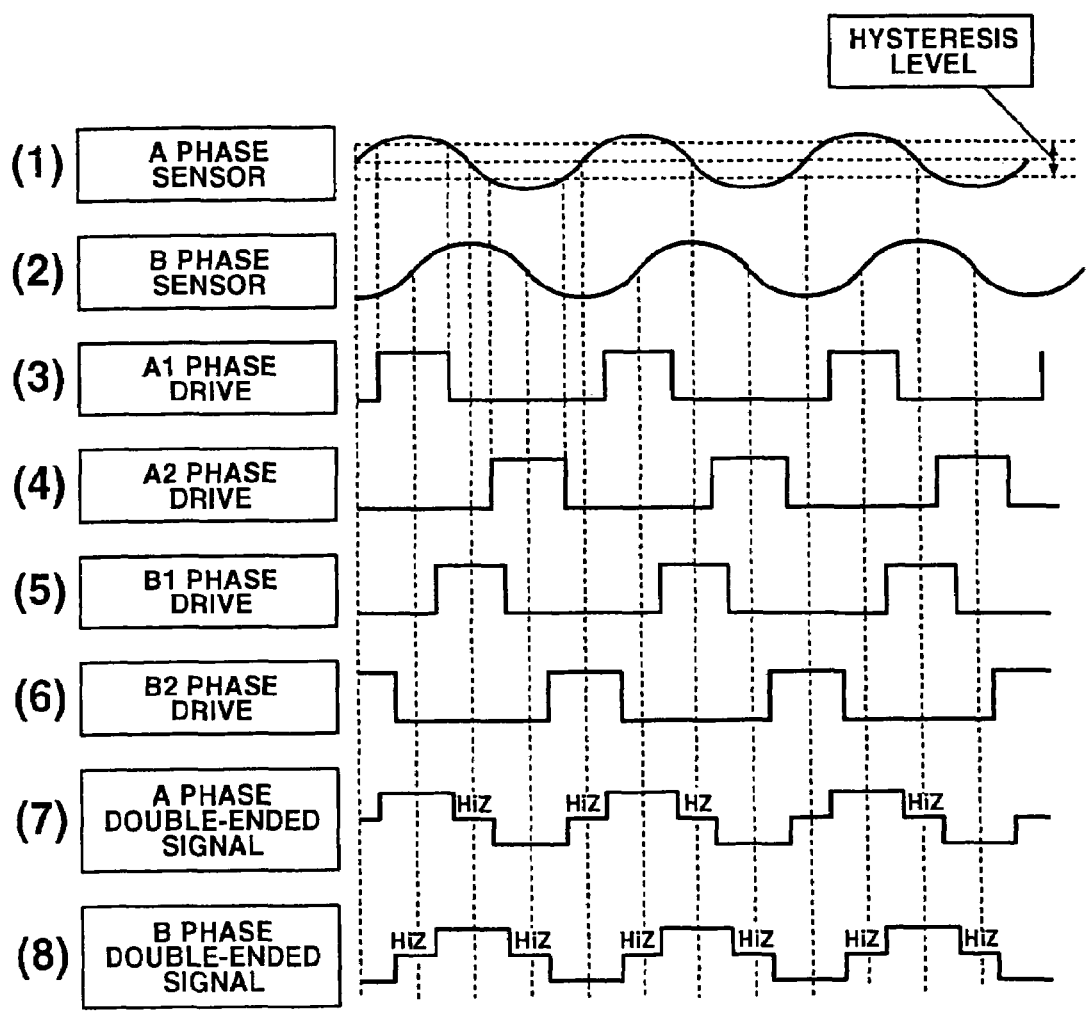
FIG. 12 is a waveform diagram respectively showing the state of the waveform control thereof.

FIG. 12 is a waveform diagram based on the control circuit of FIG. 12, and FIG. 12(1) is a sinusoidal output waveform of the A phase sensor, and FIG. 12(2) is the output waveform of the B phase sensor. FIG. 12(3) is a rectangular waveform of the frequency to be supplied to the A phase coil pair as the A1 phase drive signal, and FIG. 12(4) is a rectangular waveform to be supplied to the A phase coil pair as the A2 phase drive signal. FIG. 12(5) and FIG. 12(6) are rectangular waveforms to be supplied to the B phase coil pair. FIG. 12(7) is a voltage waveform of both ends of the A phase coil pair, and FIG. 12(8) is the voltage waveform of both ends of the B phase coil pair. In FIG. 12, the hysteresis adjustment volume may be controlled from the likes of an external CPU in a D/A converter. As a result of making the hysteresis level variable, the duty of the rectangular wave is changed, and the torque control of the motor characteristics is enabled. For example, upon starting the motor, the hysteresis level is set to minimum, and the motor is driven giving preference to the torque and sacrificing the efficiency. Further, when the motor is in a state of operational stability, the hysteresis level is set to maximum to drive the motor giving preference to high efficiency.

Figure 13:
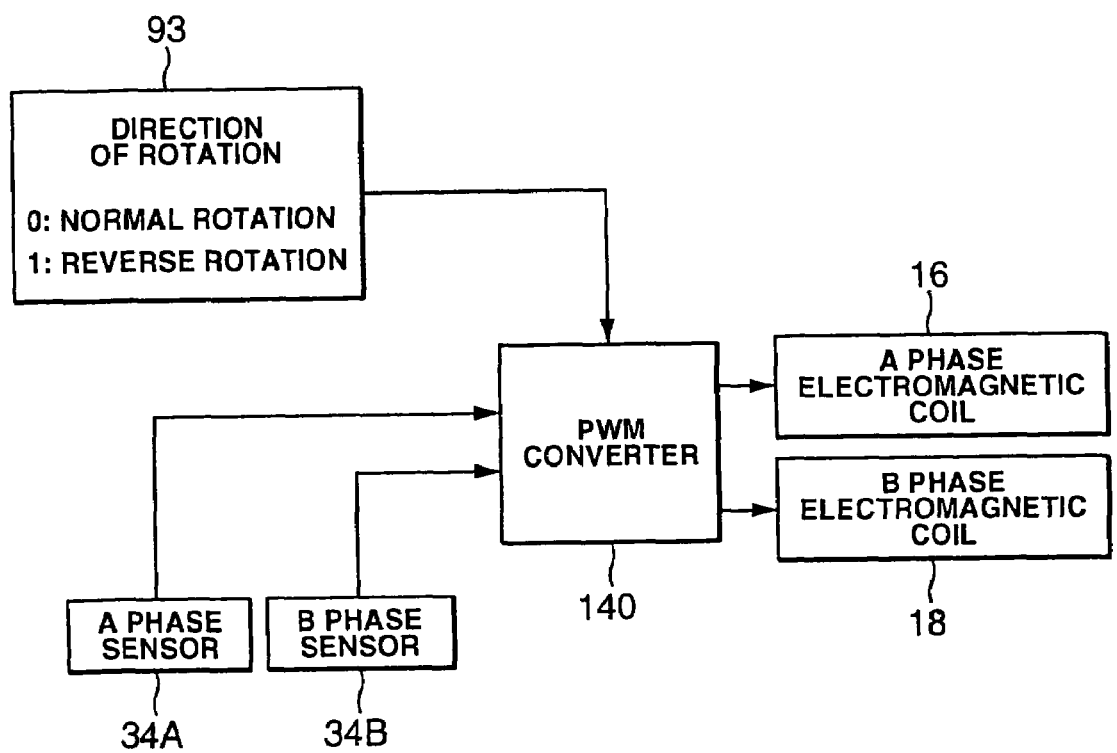
FIG. 13 is a functional block diagram of the drive circuit showing a state where the detection waveform of the respective phase coils is directly supplied to the PWM conversion control unit.
Figure 14:
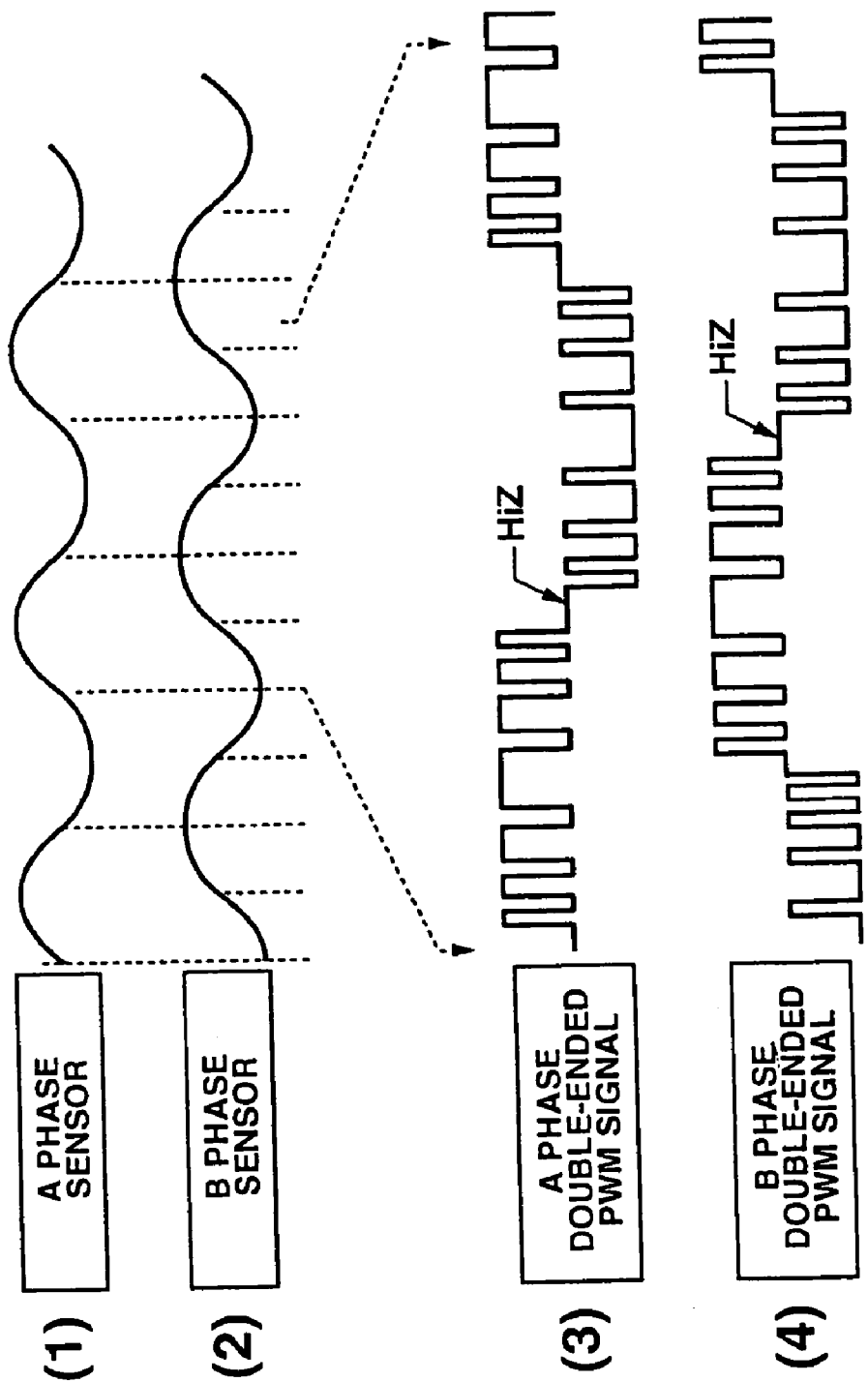
FIG. 14 is a waveform diagram showing the PWM control operation.

FIG. 13 is a block diagram of the drive circuit showing that the output of the sensor is supplied to the PMW converter 140, the analog output value of the sensor is compared with the reference wave not shown, and the duty ratio of the rectangular wave to be supplied to the respective coils is controlled (PWM controlled). In other words, as illustrated in FIG. 14, the output of the respective phase sensors (1) and (2) is duty-controlled, and becomes the voltage at both ends to be supplied to the respective phase coil pairs as shown in FIG. 14(3) and FIG. 14(4).

Figure 15:
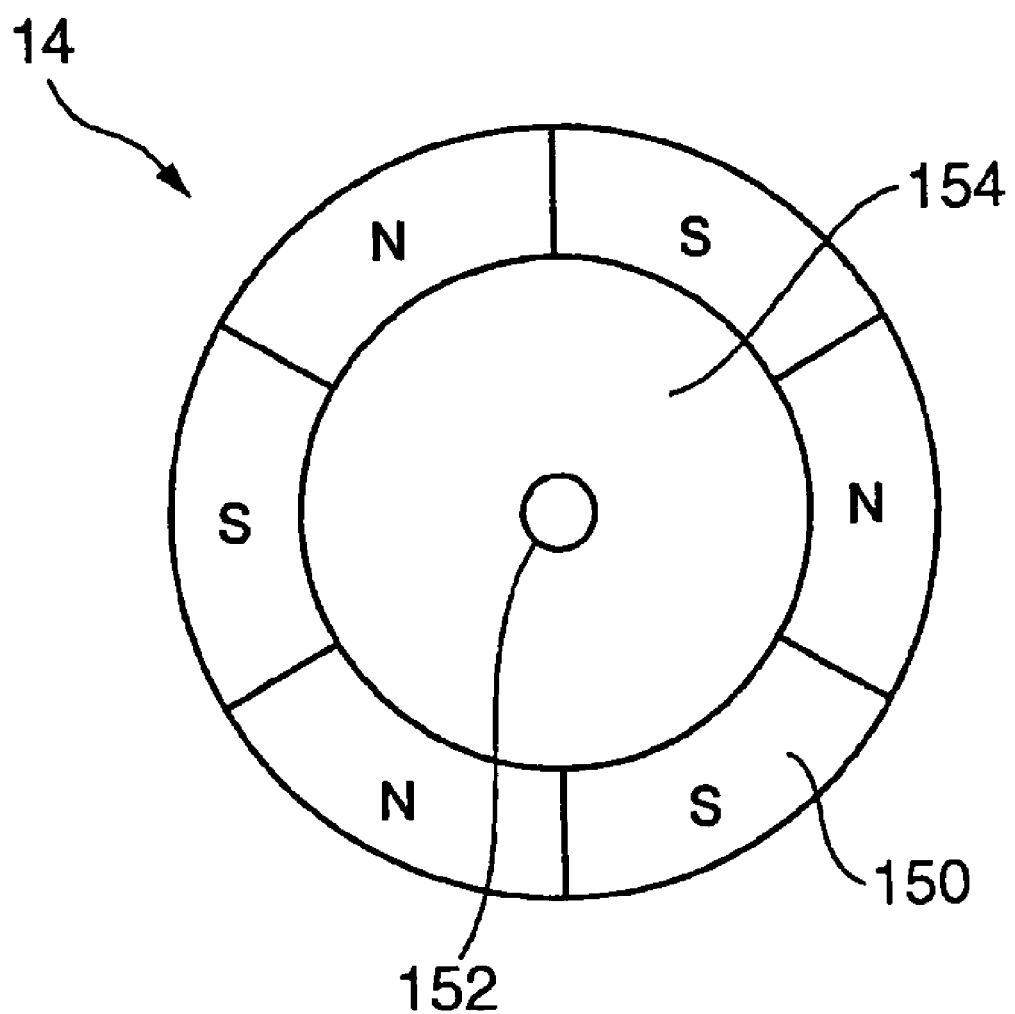
FIG. 15 is a plan view of the rotor for showing another example of the permanent magnet (rotor)
Figure 16:
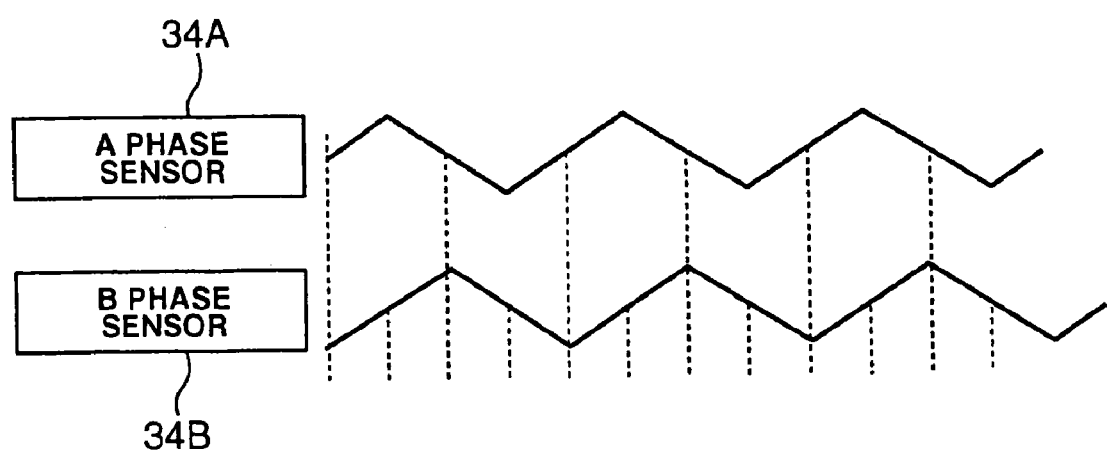
FIG. 16 is a waveform diagram of the triangular waveform output generating in the respective phase sensors upon using the rotor as the motor.

FIG. 15 is a diagram showing a plan view of the permanent magnet (rotor) 14 in which a plurality of permanent polar elements 150 has been integrated. Whereas the space between the respective permanent polar elements of the rotor is formed from a non-magnetic body in FIG. 1 and FIG. 2, with the rotor in this embodiment, the permanent polar elements are closely adhered to each other without going through an area between the respective permanent polar elements 150. Reference numeral 152 is the rotating axis of the rotor, and reference numeral 154 is the rotator. A plurality of permanent polar elements is continuously aligned around the peripheral edge of this rotator. With the [rotor] illustrated In FIG. 15, a triangular waveform back electromotive force is generated as shown in FIG. 16. Therefore, the motor can be operated at maximum efficiency by forming the detection signal of the respective phase coil array sensors into a triangular wave and supplying this to the respective phase coils.

Accordingly, even with electric motors of other methods, the motor itself can be driven at a high efficiency by exciting the coil of the motor with a waveform that is the same as the waveform of the back electromotive force generated from the electric motor, where the efficiency (work/power ratio) is not inherent in the electric motor. In other words, according to the present invention, a highly efficient motor, drive system and drive method can be realized.

What is claimed is:

1. A drive circuit for an AC motor,
    the AC motor comprising a combination of a coil body and a permanent magnet, and a pair of Hall element sensors,
    the coil body having a plurality of coils,
    the permanent magnet having a plurality of magnet pole elements, the plurality of magnet pole elements being arranged to become alternating opposite poles to rotate relative to the coil body, and
    each of the Hall element sensors being positioned at a different location and provided to detect magnetic alternation in accordance with a relative movement between the coil body and the permanent magnet and to output an analog signal corresponding to a waveform having a pattern of a back electromotive force voltage generated in the coil body,
    the drive circuit comprising:
    a first unit constituted to output a reference level;
    a second unit constituted to compare the analog signal output by the Hall element sensors with the reference level output by the first unit; and
    a third unit constituted to generate and output a drive signal to the coil body by switching a voltage based on results of a comparison by the second unit,
    wherein the first unit outputs an upper level and a lower level as the reference level,
    wherein the second unit compares the analog signal with both the upper level and the lower level, and
    wherein the third unit generates a pair of the drive signals, each drive signal respectively corresponding to results of the comparison for either the upper level or the lower level.

2. The drive circuit according to claim 1, further comprising a fourth unit constituted to alter the reference level relative to the analog signal.

3. The drive circuit according to claim 1 or 2, further comprising a fifth unit constituted to change a direction of rotation of the AC motor by reversing the polarity of the voltage switched by the third unit.

4. The drive circuit according to claim 1, wherein the third unit is a multiplexer.

5. The drive circuit according to claim 1, wherein the third unit provides the drive signal that is a rectangular waveform until a rotation speed of the AC motor exceeds a prescribed value.

6. The drive circuit according to claim 1, further comprising a sixth unit constituted to provide a waveform corresponding to the analog signal when a rotation speed of the AC motor exceeds a prescribed value.

* * * * *